United States Patent [19]

Little

[11] 3,769,689

[45] Nov. 6, 1973

[54] METHOD OF MAKING PRESSURE-TIGHT SEAL FOR SUPER ALLOY

[75] Inventor: Robert E. Little, Yorktown, Va.

[73] Assignee: The United States of America as represented by the Secretary of the National Aeronautics and Space Administration, Washington, D.C.

[22] Filed: Jan. 12, 1972

[21] Appl. No.: 217,213

[52] U.S. Cl.................. 29/498, 29/460, 29/503, 29/527.2, 117/105.2
[51] Int. Cl.................. B23k 31/02, B23k 35/24
[58] Field of Search................. 29/503, 460, 527.2, 29/498; 117/105.2

[56] References Cited
UNITED STATES PATENTS

| 1,223,777 | 4/1917 | Eby | 29/503 X |
| 1,735,809 | 11/1929 | Tebyrica | 29/503 X |
| 2,807,074 | 9/1957 | Schroeder | 29/503 X |
| 3,246,981 | 4/1966 | Quass et al. | 117/105.2 X |
| 3,322,515 | 5/1967 | Dittrich et al. | 29/191.6 X |
| 3,338,688 | 8/1967 | Longo | 117/105.2 X |
| 3,594,219 | 7/1971 | Maxwell et al. | 117/105.2 X |
| 3,620,808 | 11/1971 | Monroe, Jr. | 117/105.2 X |

Primary Examiner—J. Spencer Overholser
Assistant Examiner—Ronald J. Shore
Attorney—Howard J. Osborn et al.

[57] ABSTRACT

A pressure-tight seal for a joint formed by abutting edges of sheets of super alloy is formed by depositing by means of flame spraying on said joint a powdered alloy comprising 4.5 percent by weight of aluminum and the balance nickel. A storage compartment for liquified gases such as hydrogen stored at temperatures of −400°F comprising a storage tank for said gas surrounded by a layer of fibrous insulation material which is impregnated with carbon dioxide frost and an outer skin of super alloy sheet provided with one-way check valves to release carbon dioxide gas outside the storage compartment when a pressure of ½ to 1 pound per square inch is reached is disclosed. Joints of the outer skin of super alloy sheet are sealed by flame spraying them with the powdered nickel aluminum alloy to a thickness of about 0.040 inch.

5 Claims, 2 Drawing Figures

METHOD OF MAKING PRESSURE-TIGHT SEAL FOR SUPER ALLOY

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The advent of supersonic and hypersonic aircraft has resulted in the utilization of super alloys, such as high nickel alloys wherein the nickel content is at least 50 percent, in the construction of the outer skins of aircraft. The use of such "super alloys" is necessitated by the high temperatures to which the outer skins of hypersonic aircraft are exposed due to aerodynamic heating. The temperatures of the metal in the outer skin of such aircraft often rise to 1,600°F or higher because of such aerodynamic heating. The high temperatures encountered by such hypersonic aircraft present many difficulties in construction of the aircraft besides the necessity of providing a metal skin which will maintain its strength at high temperatuers and high stresses and not be subjected to undue metal fatigue.

Hypersonic aircraft carry large storage tanks for liquified gases such as hydrogen. The tanks are generally built into the structure of the aircraft. Because of the low temperature of liquified hydrogen, thermal protection for the storage system is necessary. The accomplishment of effective thermal protection for such tanks of liquified gases is further complicated by the extremely high temperatures to which the outer skin of the structure is exposed, particularly when because of space and weight limitations, the storage tanks for the liquified gases are in many cases in very close proximity to the outer skin of the aircraft structure, especially in the case of Monocoque-type construction.

Thus, there often exists a temperature differential over 2000°F within the space of only a few inches.

One of the thermal protection systems devised for the protection of the liquified gas tanks comprises surrounding the tank with a layer of fibrous insulation interposed between the tank and the skin of the aircraft. In addition, the fibrous insulation is impregnated with carbon dioxide frost which, when the outer skin is heated, will sublime to form carbon dioxide gas, absorbing heat. The carbon dioxide gas is allowed to escape at a controlled rate through relief valves in the outer skin of the aircraft, which in a typical installation are set to relieve at a pressure of ½ to 1 psig. The intent of maintaining carbon dioxide gas under slight pressure is to purge the area around the tank of any air and to prevent any outside air from coming into the space between the tank and the outer skin of the aircraft. It has been found that if air is allowed to come into contact with the extremely cold liquified gas storage tanks, condensation of moisture in the air takes place and causes weight to be added to the aircraft. In addition the condensing air gives off heat to the storage tanks causing the liquified fuel to boil off.

Experience has shown that it is difficult to maintain the desired pressure of the carbon dioxide gas because of leakage of the gas through the seams of the outer super alloy skin. As indicated, it is necessary that this pressure be maintained to prevent the cryo-pumping of air into the tankage section.

Attempts to seal the joints between the sheets or panels of the super alloy of the outer skin using conventional methods such as welding and brazing have yielded unsatisfactory results and/or are highly impractical. Welding produces thermal stresses in the sheets and the heat causes changes or degradation in the physical properties of the super alloy of the skin. Uneven build-ups and other variations in the weld bead were found to cause hot spots and distortion of the material.

In the case of brazing, amalgamation of the base material often resulted in the formation of an unacceptable eutectic, and, in addition required rather involved cleaning techniques.

Many of the hypersonic vehicles are of a Monocoque-type structure wherein the skin of the aircraft bears the major stesses. It is thus important that little or no change in the physical properties of the skin material take place, which will occur if, in sealing the joints of the metal sheets making up the skin, a significant amount of heat is applied to the material. For the foregoing reasons, any technique wherein the skin material is heated significantly has been found unsatisfactory. It is imperative to avoid the formation of heat gradients at the joint which would cause corrosion, strains, metal fatigue, or degradation of other desired properties.

SUMMARY OF THE INVENTION

According to the present invention, there is provided a method of forming a pressure-tight seal of a joint formed by the abutting edges of sheets of super alloy. By "super alloy" as used in the disclosure is meant a metal employed for high temperature uses under conditions where relatively high tensile, thermal, vibratory and shock stresses are encountered. Such alloys are nickel or cobalt based alloys which are oxidation resistant and capable of operation under high stresses for long periods of time at temperatures of 1,500°F to 2,000°F. The method of this invention comprises flame spraying on such joint a powder comprised of from 3 to 6 percent by weight of aluminum and from 94 to 97 percent by weight of nickel, preferably comprising 4.5 percent aluminum and the balance nickel. Examples of such powders are disclosed in U.S. Pat. No. 3,322,515.

Examples of super alloys capable of operation under high stresses for extended periods of time at temperatures of up to 2,000°F are:

a. which comprises a nickel-chromium-iron-molybdenum alloy comprising:

| Composition: | Cast: |
|---|---|
| Carbon | 0.20 max. |
| Silicon | 1.00 max. |
| Manganese | 1.00 max. |
| Chromium | 20.5–23.0 |
| Iron | 17.0–20.0 |
| Molybdenum | 8.0–10.0 |
| Cobalt | 0.50–2.50 |
| Tungsten | 0.20–1.00 |
| Nickel | balance | with:

| Physical Constants: | |
|---|---|
| Specific gravity, g/cc | 8.23 |
| Density, lb/cu.in. | 0.297 |
| Electrical resistivity at R.T. | |
| microhms/cc | 118.3 |
| microhms/cu.in. | 46.6 |
| Thermal coef. expansion/°F. | |
| 79–200°F | 0.00000770 |

| | |
|---|---|
| 79–1000°F | 0.00000839 |
| 79–1500°F | 0.00000892 |
| 79–1800°F | 0.00000920 | b. comprising:

| Composition: | Cast: |
|---|---|
| Carbon | 0.10 max. |
| Manganese | 0.50 max. |
| Iron | 5.0 max. |
| Sulphur | 0.015 max. |
| Silicon | 0.50 max. |
| Chromium | 20.0–24.0 |
| 23.0 (+ Ta) | 3.15–4.15 |
| Molybdenum | 8.0–10.0 |
| Aluminum | 0.40 max. |
| Titanium | 0.40 max. |
| Cobalt (if determined) | 1.00 max. |
| Nickel | Remainder | with:

| Physical Constants: | |
|---|---|
| Specific gravity | 8.44 |
| Density, lb/cu.in. | 0.305 |
| Specific heat, Bru/lb/°F | 0.098 |
| Thermal coef. expansion/°F × 10⁻⁶ | |
| 70–200°F | 7.1 |
| 70–1000°F | 7.8 |
| 70–1600°F | 8.8 |
| Thermal conductivity, Bru/ft$^2$/in/hr/°F | |
| at 70°F | 68 |
| at 600°F | 98 |
| at 1600°F | 158 |
| Electrical resistivity, ohms/cmf | 776 |
| Modulus of elasticity, psi × 10⁶ | |
| in tension | 29.8 |
| in torsion | 11.4 |
| Curie temperature, °F | <–320 |
| Poissons ratio | 0.308 | and (c) comprising:

| Composition: | Nominal: |
|---|---|
| Carbon | 0.09 |
| Chromium | 19.0 |
| Cobalt | 11.0 |
| Molybdenum | 10.0 |
| Titanium | 3.0 |
| Aluminum | 1.5 |
| Nickel | Remainder | with:

| Physical Constants: | |
|---|---|
| Density, lb/cu.in. | 0.298 |
| Thermal coef. expansion/°F × 10⁻⁶ | |
| 70–1000°F | 7.5 |
| 70–1500°F | 8.45 |
| 70–1600°F | 8.70 |
| Thermal conductivity, BTU/ft$^2$/in/hr/°F | |
| at 1100°F | 139 |
| at 1600°F | 175 |
| Specific heat, BTU/lb/°F | 0.108 |
| Modulus of elasticity, psi × 10⁶ | |
| at 1200°F | 25.9 |
| at 1600°F | 23.2 |

The use of such method overcomes the problems encountered in forming a pressure-tight seal without inducing distortion and degradation of physical properties of the super alloy material forming the skin of the aircraft. Compatibilites of the materials of the base material and that of the powdered alloy applied using a flame spraying technique are excellent. Furthermore, using the flame spraying technique simplifies the procedure of forming the joint seal. There is no detrimental heating of the base material since the temperature of the base material does not go above about 350°F, and in most instances is below 300°F. It has been found that the joint which is formed with the sealing alloy and the base material has a tensile strength of up to 3,300 psi and that the applied alloy material not only covers the seam joints very effectively but is forced into the seam joints. The ductility of the seal is excellent and it has been found that the porosity is less than 2 percent. Best results are obtained when a layer about 0.040 inch is built up; however, thicknesses of 0.020 to 0.060 are useful. The super alloy skin structures sealed according to the practice of this invention have withstood pressures in excess of 8 pounds per square inch. It has been found that the most effective seal of the joints is obtained if the area to be sealed is first cleaned with a solvent such as a halogenated hydrocarbon such as trichlorofluoroethane, tetrachloroethylene, and the like. While not necessary, it is desirable to mask the surface of the sheet alloy surrounding the joint in order to prevent unnecessary overcoating.

The powdered alloy material may be sprayed on using flame spraying apparatus which utilizes an oxy-acetylene gas mixture. The temperature of the powdered alloy at the gun nozzle is approximately 5,800°F to 6,300°F. It has been found that holding the gun approximately 5 to 6 inches from the surface to be coated is most effective. After application of the alloy, the sealed joint may be finished by grinding and buffing to the size and smoothness desired. In addition to sealing the joints of the liquified gas storage compartment so as to prevent the leakage of carbon dioxide except at controlled pressure relief valves, the process of the present invention adds additional strength to the skin structure helping to eliminate bucking and because of the excellent ductility, serves to dampen vibrations.

DESCRIPTION OF A PREFERRED EMBODIMENT

Figure 1:
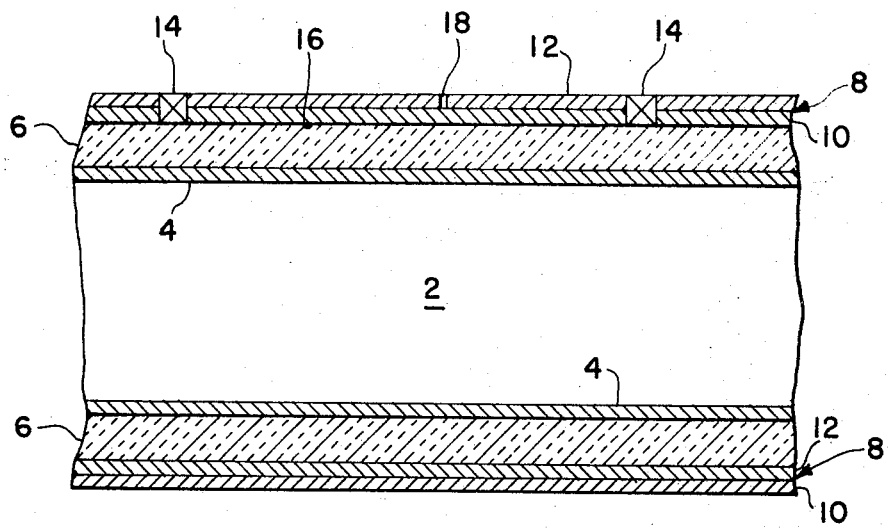
FIG. 1 is a cross section of a portion of a liquified gas storage tank covered with fibrous insulation and contained within the outer super alloy skin structure of an aircraft.

A section of a storage tank 2 for a liquified gas such as hydrogen is shown in FIG. 1 of the drawing. The walls 4 of the storage tank 2 are covered with a layer 6 of fibrous insulation material such as glass wool, asbestos, or other suitable material. The fibrous material 6 is placed between the walls 4 of the storage tank 2 and the skin structure 8 of the hypersonic aircraft. The skin structure 8 comprises two layers of super alloy sheet material, an inner layer 10 and an outer layer 12 which are secured together by rivets not shown. The super alloy has the composition of c above. Check valves 14 installed in the skin structure 8 place the space 16 between the skin structure 8 and the tank walls 4 in communication with the space outside the skin structure 8 when subjected to a pressure of ½ to 1 pound per square inch from the inner side. The fibrous insulation material is impregnated with carbon dioxide frost. As indicated above, in the case of liquid hydrogen, the hydrogen in the storage tank 2 is at a temperature of about –430°F. In flight, the outer surface of the skin structure 8 will often reach temperatures of 1,600°F. The carbon dioxide frost will sublime to carbon dioxide gas and when a pressure of ½ to 1 pound per square inch is reached, the check valves 14 will open and carbon dioxide gas will escape at a controlled rate. The subliming of the carbon dioxide frost draws heat away from the tank 2 and the hydrogen contained therein.

A joint 18 formed by two sheets 20 and 22 of the outer layer 12 is sealed with a flame sprayed powdered alloy of 4.5 percent by weight of aluminum and the balance nickel. (U.S. Pat. No. 3,322,515)

Figure 2:
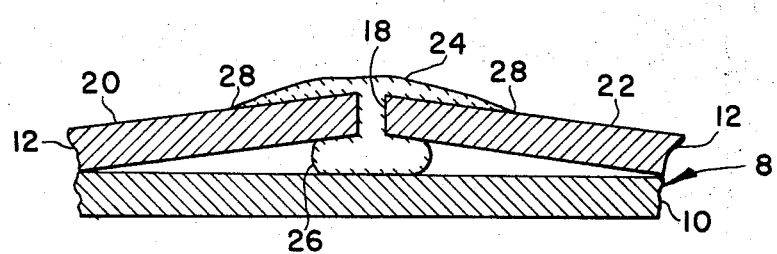
FIG. 2 shows a cross section of a flame sprayed alloy seal at a joint formed by two sections of super alloy.

FIG. 2 shows an enlarged cross section of the joint 18 which has been flame sprayed with the nickel-aluminum alloy used in the process of this invention. The seal 24 fills the joint 18 and partially flows under the sheets 20 and 22 as shown at 26. The sprayed alloy is applied to a thickness of about 0.040 inch and overlies either side of the joint 18 to edge 28. Following application of the sealing alloy, the seal formed may be ground and polished to tapered finish as shown at edges 28.

The joint 18 and the area surrounding it are first cleaned with tri-chloroethylene and then abraded slightly with aluminum oxide. The surfaces (not shown) of sheets 20 and 22 beyond the areas 28 were masked to prevent overcoating of the surfaces. The powdered alloy of 4.5 percent by weight aluminum and the balance nickel was then applied using an oxyacetylene gas mixture to flame spray the powder with temperatures of about 5,800°F to 6,300°F at the nozzle of the gun.

As indicated, the seal 24 is applied to a thickness of about 0.040 inch on the surface of the sheets 20 and 22. The edges 28 are thereafter finished by grinding or polishing to a smooth finish.

The present ivention provides a simplified method of providing a pressure-tight seal for a joint formed by abutting edges of sheets of super alloy material by flame spraying the joint with an alloy of nickel and aluminum. A pressure-tight seal is provided and the super alloy sheet material is not subjected to any thermal stresses or distortion and the integrity of the critical physical properties of the super alloy sheet material is maintained since the temperature of the base sheet material is generally below 300°F during the deposition of the sealing alloy.

While the invention has been explained by a detailed description of a specific embodiment, it is understood that various modifications and substitutions can be made within the scope of the appended claims which are intended to include equivalents of such embodiment.

What is claimed is:

1. A method of providing a pressure-tight seal of a joint formed by abutting edges of sheets of super alloy comprising, providing sheets of super alloy in abutting edge to edge relationship in substantially the same plane depositing on, through and under said joint, by means of flame spraying, a powdered alloy comprising from 3 to 6 percent by weight of aluminum and from 94 to 97 percent by weight of nickel.

2. A method as claimed in claim 1 wherein said powdered alloy is comprised of about 4.5 percent aluminum and the balance nickel by weight.

3. A method as claimed in claim 1 wherein the temperature of said sheets is maintained below 300°F during depositing of said powdered alloy.

4. A method as claimed in claim 2 wherein the temperature of said sheets is maintained below 300°F during depositing of said powdered alloy.

5. A method as claimed in claim 4 wherein said alloy is deposited on the joint of said sheets to a thickness of 0.040 inch.

* * * * *